United States Patent
Yamori

(10) Patent No.: US 10,645,423 B2
(45) Date of Patent: May 5, 2020

(54) VIDEO IMAGE ENCODING DEVICE AND VIDEO IMAGE ENCODING METHOD

(71) Applicant: FUJITSU LIMITED, Kawasaki-shi, Kanagawa (JP)

(72) Inventor: Akihiro Yamori, Kawasaki (JP)

(73) Assignee: FUJITSU LIMITED

( * ) Notice: Subject to any disclaimer, the term of this patent is extended or adjusted under 35 U.S.C. 154(b) by 0 days.

(21) Appl. No.: 16/189,256

(22) Filed: Nov. 13, 2018

(65) Prior Publication Data

US 2019/0166385 A1 May 30, 2019

(30) Foreign Application Priority Data

Nov. 29, 2017 (JP) .................................. 2017-228765

(51) Int. Cl.
- *H04N 19/61* (2014.01)
- *H04N 19/86* (2014.01)
- *H04N 19/139* (2014.01)
- *H04N 19/176* (2014.01)
- *H04N 19/172* (2014.01)
- *H04N 19/119* (2014.01)
- *H04N 19/14* (2014.01)

(52) U.S. Cl.
CPC .......... *H04N 19/86* (2014.11); *H04N 19/119* (2014.11); *H04N 19/139* (2014.11); *H04N 19/14* (2014.11); *H04N 19/172* (2014.11); *H04N 19/176* (2014.11)

(58) Field of Classification Search
CPC .... H04N 19/176; H04N 19/122; H04N 19/14; H04N 19/86; H04N 19/172; H04N 19/139

See application file for complete search history.

(56) References Cited

U.S. PATENT DOCUMENTS

| | | | | |
|---|---|---|---|---|
| 2006/0147090 A1* | 7/2006 | Yang | ...................... | H04N 5/145 382/107 |
| 2007/0047652 A1* | 3/2007 | Maruyama | ............. | H04N 19/61 375/240.16 |
| 2017/0249759 A1* | 8/2017 | Hsieh | ........................ | G06T 7/11 |

FOREIGN PATENT DOCUMENTS

| | | |
|---|---|---|
| JP | 2003-259376 | 9/2003 |
| JP | 2008-219205 | 9/2008 |

\* cited by examiner

*Primary Examiner* — Obafemi O Sosanya
(74) *Attorney, Agent, or Firm* — Fujitsu Patent Center

(57) ABSTRACT

A video image encoding device includes a memory and a processor. The processor is configured to determine a noise distribution within a target image to be encoded and included in a video image. The processor may limit sizes of blocks to be used for video image encoding of the target image to one or more sizes among multiple selectable sizes when it is determined that the noise distribution within the target image to be encoded is a predetermined noise distribution. The processor may also encode the target image by executing the video image encoding using the blocks of the one or more sizes.

12 Claims, 10 Drawing Sheets

411

VIDEO IMAGE ENCODING DEVICE AND VIDEO IMAGE ENCODING METHOD

CROSS-REFERENCE TO RELATED APPLICATION

This application is based upon and claims the benefit of priority of the prior Japanese Patent Application No. 2017-228765, filed on Nov. 29, 2017, the entire contents of which are incorporated herein by reference.

FIELD

The embodiment discussed herein is related to a video image encoding device and a video image encoding method.

BACKGROUND

In video image encoding, each image included in a video image and corresponding to multiple time points is divided into multiple blocks, and an encoding process is executed on the blocks on a block basis. For example, in High Efficiency Video Coding (HEVC) that is one video image encoding scheme, blocks of a layered structure that are coding units (CUs), prediction units (PUs), transform units (TU), and the like are used. The size of a block of n pixels×n pixels (n is an integer of 1 or more) is hereinafter referred to as n×n in some cases.

As block sizes of the CUs, PUs, and TUs, the following sizes may be selected, for example.

The CUs: 8×8 to 64×64
The PUs: 4× 4 to 64× 64
The TUs: 4×4 to 32×32

A video image encoding device configured to control an upper limit frequency or orthogonal transform size of an orthogonal transform coefficient based on the variance of pixel values of an input image is also known (refer to, for example, Japanese Laid-open Patent Publication No. 2003-259376 and Japanese Laid-open Patent Publication No. 2008-219205).

SUMMARY

According to an aspect of the embodiments, a video image encoding device includes a memory, and a processor coupled to the memory and the processor configured to determine a noise distribution within a target image included in a video image and to be encoded, limit sizes of blocks to be used for video image encoding of the target image to one or more sizes among multiple selectable sizes when it is determined that the noise distribution within the target image to be encoded is a predetermined noise distribution, and encode the target image by executing the video image encoding using blocks of the one or more sizes.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

When noise exists in an image to be encoded, a block size to be selected may be affected and changed by the noise, and an appropriate block size may not be selected.

This problem may occur in not only HEVC but also another video image encoding scheme using multiple selectable block sizes.

A technique for executing encoding suitable for a noise distribution of an image to be encoded in video image encoding using multiple selectable block sizes is described below in detail with reference to the accompanying drawings.

In HEVC, the efficiency of encoding may be improved by applying large blocks to portions in which the motion vector is small in images or to portions in which patterns are simple (smooth) in images, and applying small blocks to portions in which the motion vector is large in images or to portions in which patterns are complex in images. Regarding a TU, since a TU block size used in an encoding process directly depends on the amount of information of a quantization coefficient, the block size largely affects the efficiency of the encoding.

In a reference model of HEVC, a block size to be applied is determined by mode determination using the method of Lagrange multipliers. In this mode determination, a mode in which the following prediction mode cost C is minimized is selected.

$$C = D + \lambda * R \qquad (1)$$

D included in Equation (1) indicates a prediction difference that is the difference between an original image and a predicted image, R indicates the amount (bit amount) of information generated upon the encoding of mode information of a prediction mode, and λ is a transform coefficient determined based on a quantization parameter (QP). As D, the sum of absolute differences (SAD), the sum of absolute transformed differences (SATD), or the like is used, for example.

When an image having a complex pattern is to be encoded using a HEVC test model (HM) that is reference software of HEVC, a block size determined by the mode determination may not be a fixed value. For example, block sizes applied to a darkroom image including gain up noise or to an image including random noise (sandstorm) slightly vary depending on positions in the image. The variation in the block sizes may reduce a subjective quality of a decoded video image.

Even when any block size is selected for an image having noise, the efficiency of an encoding process that is evaluated on a block basis does not largely vary and the prediction mode cost C does not vary so much. Thus, one of selectable block sizes is selected based on a slight variation in the prediction mode cost C that slightly varies depending on a position within the image. Thus, even when uniform noise exists in an entire image to be encoded, block sizes to be used in the encoding process may not be a fixed value.

Figure 1:
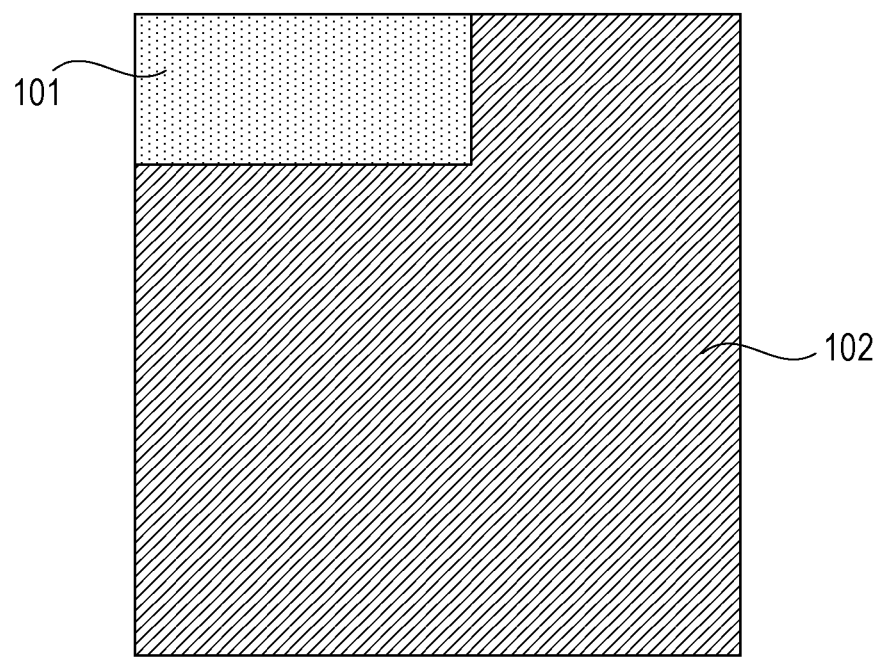
FIG. 1 is diagram illustrating a decoded image of a darkroom image.

FIG. 1 illustrates an example of a decoded image obtained by decoding an encoded image obtained by encoding a darkroom image by HEVC. The decoded image illustrated in FIG. 1 corresponds to a partial rectangular region included in a single image.

In the entire darkroom image to be encoded, uniform gain up noise exists due to an increase in a gain of a camera installed at a dark location. However, in a portion 101 in which an applied TU block size is large, a smooth decoded image in which noise has been broken and has disappeared is obtained. In a portion 102 in which a TU block size is small, a decoded image in which noise is not broken and remains is obtained. Noise states vary for the portions of the decoded image, and the uniformity of gain up noise in the original image is broken.

Figure 2:
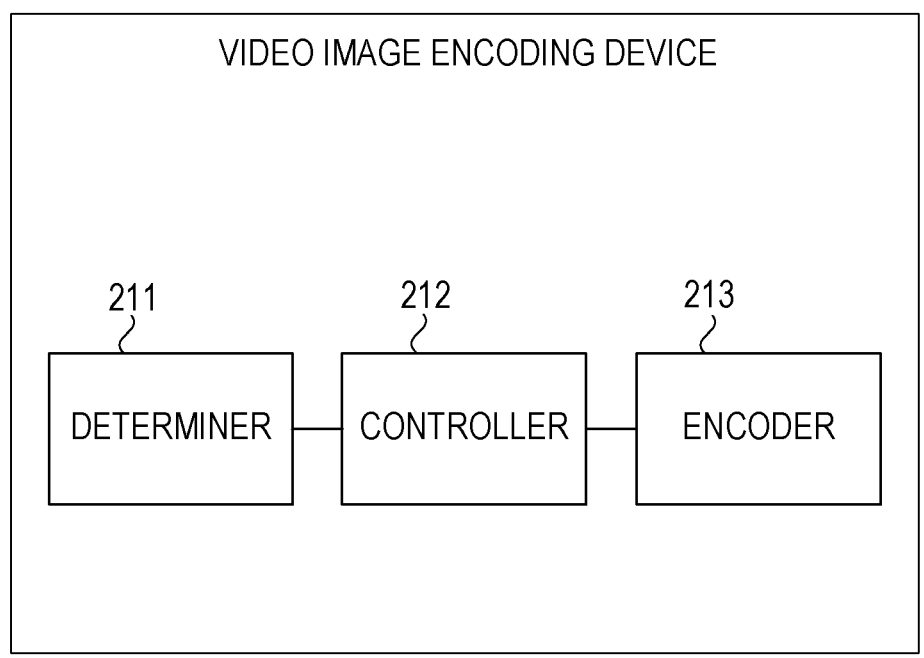
FIG. 2 is a diagram illustrating a functional configuration of a video image encoding device.

FIG. 2 illustrates an example of a functional configuration of a video image encoding device according to an embodiment. A video image encoding device 201 illustrated in FIG. 2 includes a determiner 211, a controller 212, and an encoder 213.

Figure 3:
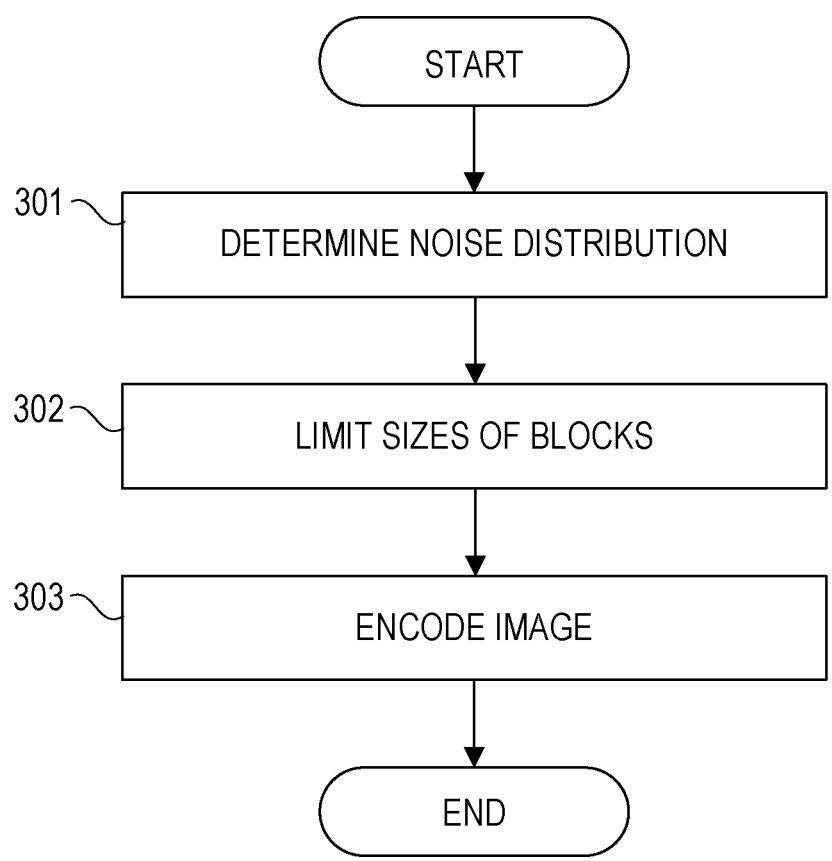
FIG. 3 is a flowchart of a video image encoding process.

FIG. 3 is a flowchart illustrating an example of a video image encoding process to be executed by the video image encoding device 201 illustrated in FIG. 2. The determiner 211 determines a noise distribution within a target image included in a video image and to be encoded (in operation 301). When the determiner 211 determines that the noise distribution within the target image to be encoded is a predetermined noise distribution, the controller 212 limits block sizes to be used for video image encoding of the target image to one or more sizes among multiple selectable sizes (in operation 302). The encoder 213 executes video image encoding using blocks of the one or more sizes to encode the target image (in operation 303).

The video image encoding device 201 illustrated in FIG. 2 may execute encoding suitable for the noise distribution of the target image to be encoded in the video image encoding using the multiple selectable block sizes.

Figure 4:
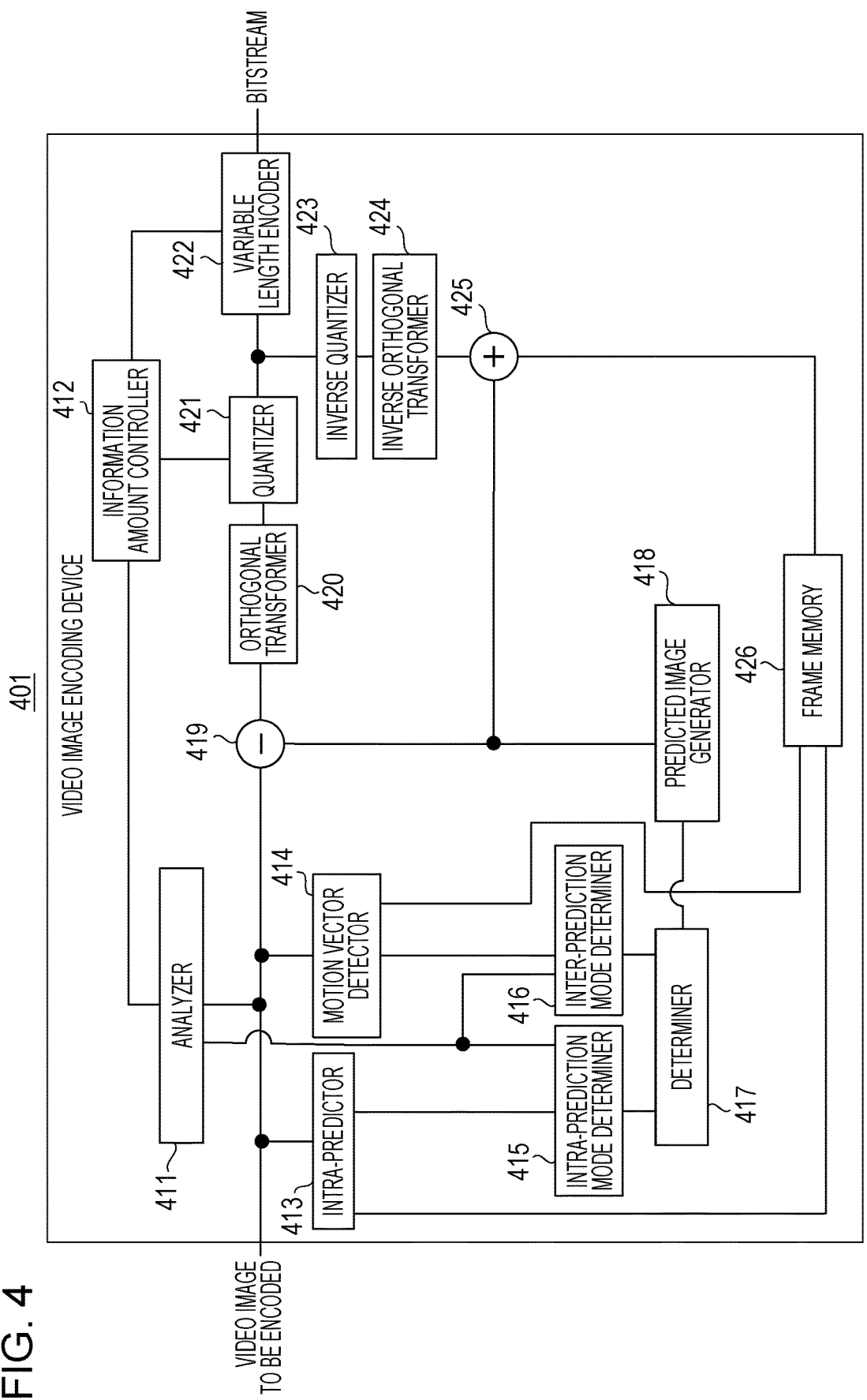
FIG. 4 is a diagram illustrating a specific example of a functional configuration of the video image encoding device.

FIG. 4 illustrates a specific example of the video image encoding device 201 illustrated in FIG. 2. A video image encoding device 401 illustrated in FIG. 4 includes an analyzer 411, an information amount controller 412, an intra-predictor 413, a motion vector detector 414, an intra-prediction mode determiner 415, an inter-prediction mode determiner 416, a determiner 417, and a predicted image generator 418. The video image encoding device 401 also includes a difference generator 419, an orthogonal transformer 420, a quantizer 421, a variable length encoder 422, an inverse quantizer 423, an inverse orthogonal transformer 424, a reconfigurer 425, and a frame memory 426.

Figure 5:
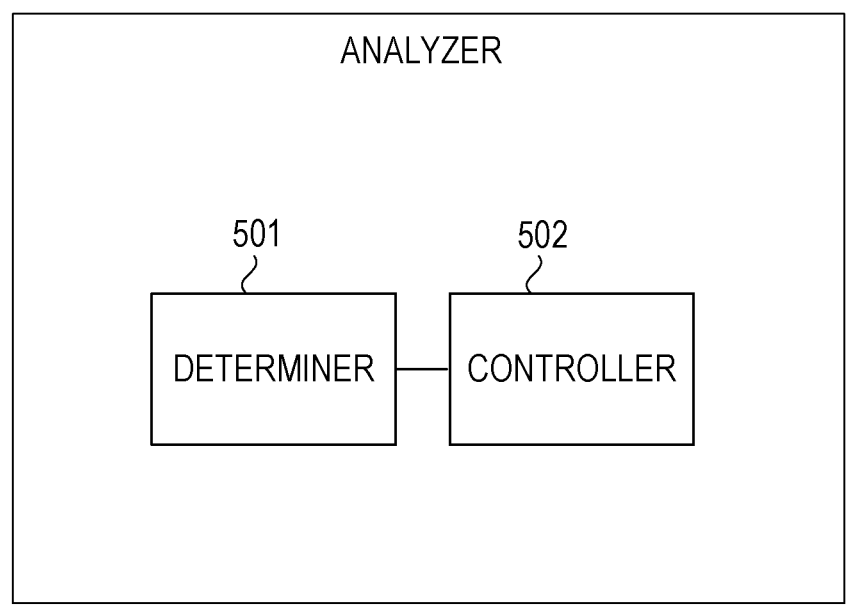
FIG. 5 is a diagram illustrating a functional configuration of an analyzer.

FIG. 5 illustrates an example of a functional configuration of the analyzer 411 illustrated in FIG. 4. The analyzer 411 illustrated in FIG. 5 includes a determiner 501 and a controller 502. The determiner 501 and the controller 502 correspond to the determiner 211 and the controller 212 that are illustrated in FIG. 2, respectively.

Referring again to FIG. 4, the intra-predictor 413, the motion vector detector 414, the intra-prediction mode determiner 415, the inter-prediction mode determiner 416, the determiner 417, and the predicted image generator 418, which are illustrated in FIG. 4, correspond to the encoder 213 illustrated in FIG. 2. The difference generator 419, the orthogonal transformer 420, the quantizer 421, the variable length encoder 422, the inverse quantizer 423, the inverse orthogonal transformer 424, and the reconfigurer 425 correspond to the encoder 213.

The video image encoding device 401 may be implemented as a hardware circuit, for example. In this case, the constituent elements of the video image encoding device 401 may be implemented as separate circuits or may be implemented as a single integrated circuit.

The video image encoding device 401 encodes an input target video image according to HEVC and outputs the encoded video image as a bitstream. The target video image to be encoded includes multiple chronological pictures. The pictures correspond to images to be encoded and are also referred to as frames. The pictures may be color images or monochrome images. When the pictures are color images, pixel values may be in the red, green, blue (RGB) format or the luma (Y) and chrominance (UV) (YUV) format.

Each of the pictures is divided into multiple blocks that are referred to as coding tree units (CTUs). Each of the CTUs is divided into one or more CUs. The CUs are encoded according to either inter-prediction encoding or intra-prediction encoding. The inter-prediction encoding is an encoding scheme for using information of an encoded image to encode a target image. The intra-prediction encoding is an encoding scheme for using only information included in a target image to be encoded to encode the target image.

Each of the CUs is divided into one or more PUs and divided into one or more TUs. The inter-prediction and the intra-prediction are executed on a PU basis, while orthogonal transformation and quantization are executed on a TU basis. Each of block sizes of TUs is any of 32×32, 16×16, 8×8, and 4×4.

The intra-predictor 413 uses a decoded image stored in the frame memory 426 to generate intra-predicted images in multiple intra-prediction modes for CUs of multiple block sizes. The intra-predictor 413 outputs the generated intra-predicted images to the intra-prediction mode determiner 415.

The intra-prediction mode determiner 415 uses the intra-predicted images output by the intra-predictor 413 to determine an optimal intra-prediction mode and a TU block size. The intra-prediction mode determiner 415 outputs the determined intra-prediction mode and an encoding cost corresponding to the determined intra-prediction mode to the determiner 417. As the encoding cost, the prediction mode cost C included in Equation (1) may be used.

The motion vector detector 414 uses a decoded image stored in the frame memory 426 to determine motion vectors and reference indices of the decoded image for the CUs of the multiple block sizes. The motion vector detector 414 outputs the determined motion vectors and the determined reference indices to the inter-prediction mode determiner 416.

The inter-prediction mode determiner 416 uses the motion vectors and reference indices output by the motion vector detector 414 to determine an optimal inter-prediction mode and a TU block size. The inter-prediction mode determiner 416 outputs the determined inter-prediction mode and an encoding cost corresponding to the determined inter-prediction mode to the determiner 417.

The determiner 417 compares the encoding cost output by the intra-prediction mode determiner 415 with the encoding cost output by the inter-prediction mode determiner 416 and determines whether the intra-prediction mode or the inter-prediction mode is applied to each of the CUs. The determiner 417 outputs the determined mode to the predicted image generator 418.

The predicted image generator 418 generates predicted images for the CUs in accordance with the prediction mode output by the determiner 417 and outputs the generated predicted images to the difference generator 419 and the reconfigurer 425.

The difference generator 419 outputs, to the orthogonal transformer 420, differences between the predicted images output by the predicted image generator 418 and original images of the CUs as prediction differences. The orthogonal transformer 420 executes the orthogonal transformation on the differences output by the difference generator 419 and outputs a transform coefficient to the quantizer 421. The quantizer 421 quantizes the transform coefficient and outputs the quantized coefficient to the variable length encoder 422 and the inverse quantizer 423.

The variable length encoder 422 executes variable length encoding to encode the quantized coefficient output by the quantizer 421 and mode information of the prediction mode and outputs the bitstream of the encoded video image. The variable length encoder 422 outputs the amount of information generated due to the variable length encoding to the information amount controller 412.

The inverse quantizer 423 executes inverse quantization on the quantized coefficient output by the quantizer 421 to generate the result of the inverse quantization and outputs the generated result of the inverse quantization to the inverse orthogonal transformer 424. The inverse orthogonal transformer 424 executes inverse orthogonal transformation on the result of the inverse quantization to generate prediction differences and outputs the generated prediction differences to the reconfigurer 425.

The reconfigurer 425 adds the predicted images output by the predicted image generator 418 to the prediction differences output by the inverse orthogonal transformer 424 to generate a reconfigured image and outputs the generated reconfigured image to the frame memory 426. The frame memory 426 stores the reconfigured image output by the reconfigurer 425 as a decoded image.

The information amount controller 412 determines a target quantization parameter (target QP) so that the amount of the information output by the variable length encoder 422 matches a target information amount. The information amount controller 412 outputs the determined target QP to the quantizer 421 and the analyzer 411. The information amount controller 412 may determine a target QP for each of the CUs.

The determiner 501 (illustrated in FIG. 5) of the analyzer 411 determines, based on multiple pixel value distributions of multiple regions within a picture and a similarity between the pixel value distributions, whether or not a noise distribution within the picture is the predetermined noise distribution. For example, the predetermined noise distribution may indicate noise uniformly distributed within a picture.

When the determiner 501 determines that the noise distribution within the picture is the predetermined noise distribution, the controller 502 limits block sizes to be used for video image encoding of the picture to one or more sizes among multiple selectable block sizes. For example, the controller 502 may limit the block sizes to be used for the video image encoding to a single block size.

The analyzer 411 outputs control information indicating the limited block sizes to the intra-prediction mode determiner 415 and the inter-prediction mode determiner 416. The intra-prediction mode determiner 415 and the inter-prediction mode determiner 416 determine block sizes to be used for the video image coding of the picture in accordance with the control information output by the analyzer 411 so that the determined block sizes are in a range of the limited block sizes.

The video image encoding device 401 may transmit the bitstream via a communication network to a video image decoding device that is not illustrated. In this case, the video image decoding device decodes the bitstream to restore the video image to be encoded.

The video image encoding device 401 is used for various purposes. For example, the video image encoding device 401 may be installed in a video camera, an image transmitting device, an image receiving device, a video phone system, a computer, or a mobile phone.

The video image encoding device 401 illustrated in FIG. 4 may determine, based on multiple pixel value distributions of multiple regions within a picture, whether or not predetermined noise exists in the picture. Thus, the video image encoding device may limit block sizes to be used for video image encoding of a picture in which predetermined noise exists, and the video image encoding device may execute encoding suitable for a distribution of the noise.

For example, when uniform noise exists in an entire picture, a noise state within a decoded image generated by the video image decoding device varies depending on a block size to be used for the video image encoding. It is, therefore, desirable that the analyzer 411 change a range of limited block sizes on a picture basis.

The intra-prediction mode determiner 415 and the inter-prediction mode determiner 416 repeatedly determine whether or not a block to be used for video image encoding is to be divided into smaller blocks. For example, which block size among block sizes of 32×32 to 4×4 is applied to TUs is determined by recursively determining whether or not each block is divided into 4 blocks that are 2×2 blocks.

When uniform noise exists in an entire picture, patterns of blocks within the picture may be similar to each other in many cases. In this case, when a strong component exists at the same frequency in a frequency spectrum indicating a pixel value distribution of multiple small blocks into which a large block is divided, a strong component is generated at the frequency even in a frequency spectrum of the large block.

In the determination of whether or not a certain block is to be divided into small blocks, it is considered that a similarity between patterns of blocks is determined based on statistical information of pixel values. When uniform noise exists in an entire picture, the following two requirements are satisfied.

(a) When a pattern of the picture is complex, the sum of variances (activities) of pixel values within the picture is large in multiple pixel value distributions of multiple regions within the picture.

(b) Activities are uniform in the multiple regions within the picture.

When the picture is divided into a number M (M is an integer of 2 or more) of regions, and a number N (N is an integer of 2 or more) of pixels are included in each of the regions, the requirement (a) is expressed according to the following equations, for example.

$$V1 = \sum_{j=1}^{M} V(j) > TH1 \quad (11)$$

-continued $$V(j) = \frac{1}{N}\sum_{i=1}^{N}(x(j,i) - Ave(j))^2 \qquad (12)$$

$$Ave(j) = \frac{1}{N}\sum_{i=1}^{N}x(j,i) \qquad (13)$$

The regions may be rectangular regions (blocks) of the same size. In Equation (11), V(j) indicates the variance of pixel values in a j-th region (j is 1 to M), V1 indicates the sum of a number M of variances V(j) of pixel values within the picture, and TH1 indicates a threshold for V1. In Equation (12), x(j, i) indicates a pixel value of an i-th pixel (i=1 to N) within the j-th region, and Ave(j) indicates an average value of a number N of pixel values within the j-th region.

The requirement (b) is expressed according to the following equations, for example.

$$V2 = \frac{1}{M}\sum_{j=1}^{M}(V(j) - Ave)^2 < TH2 \qquad (14)$$

$$Ave = \frac{1}{M}\sum_{j=1}^{M}V(j) \qquad (15)$$

In Equation (14), Ave indicates an average value of the number M of variances V(j) of the pixel values within the picture, V2 indicates the variance of the number M of variances V(j) of the pixel values within the picture, and TH2 indicates a threshold for V2. It is considered that as V2 is smaller, a number M of pixel value distributions of a number M of regions are more similar to each other.

For example, values of TH1 and TH2 are determined by a simulation using a picture in which uniform noise exists.

When the requirements (a) and (b) are satisfied, the determiner 501 determines that uniform noise exists in the entire picture. The controller 502 limits block sizes to be used for video image encoding of the picture to one or more sizes. By limiting the block sizes, a difference between the block sizes within the picture is reduced, and the uniformity of noise in an original image is maintained in a decoded image obtained by decoding the picture. Thus, a subjective quality of a decoded video image is improved.

By limiting block sizes in a video image encoding scheme in which block sizes of three or more types are selectable like HEVC, a subjective quality of a decoded video image is significantly improved.

Figure 6:
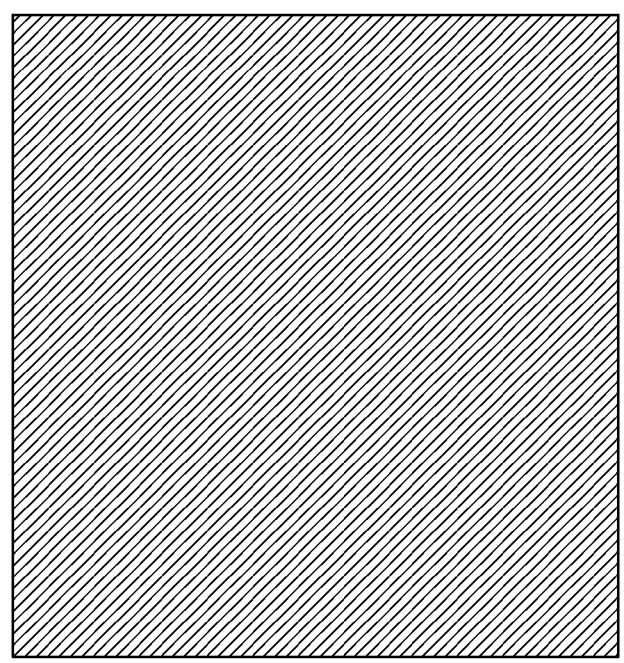
FIG. 6 is a diagram illustrating a decoded image in the case where block sizes are limited.

FIG. 6 illustrates an example of a decoded image in the case where block sizes of TUs are limited to a single size. A decoded image illustrated in FIG. 6 corresponds to the rectangular region illustrated in FIG. 1, and uniform noise exists in the entire image illustrated in FIG. 6. When block sizes are limited to a single size, it is considered that the effectiveness of making uniform a noise state within the decoded image is high.

For example, the controller 502 may cause ranges of limited block sizes to vary for layers of time hierarchical encoding (scalable encoding). In this case, the controller 502 determines the ranges of the block sizes based on the complexity of pictures encoded before the encoding of target pictures to be encoded and information amounts determined by information amount control and to be assigned.

The information amount controller 412 uses a quantization parameter to adjust the roughness of quantization scale and executes the information amount control so that the amount of information generated due to the variable length encoding is converged to a fixed information amount. However, when the quantization parameter is increased and the quantization scale is increased to the maximum value, the information amount control may fail in the worst case. Thus, when the target QP determined by the information amount controller 412 is large, the controller 502 limits block sizes to larger sizes and reduces the amount of mode information indicating whether or not block division is to be executed. This may avoid the failure of the information amount control.

An example of a process of determining the target QP in time hierarchical encoding according to Moving Picture Experts Group Phase 2 (MPEG2) Test Model 5 (TM5) is described. When a picture having a temporal ID (TID) of k is referred to as picture (k), the following parameters are used in this process.

k_prev: a TID of a previous picture
K_crnt: a TID of a current picture
X[k_prev]: a global complexity measure (GCM) indicating the complexity of the previous picture (k_prev)
PicInfo[k_prev]: the amount of information generated due to the variable length encoding of the previous picture (k_prev)
AveQP[k_prev]: an average value of quantization parameters for blocks used in the previous picture (k_prev)
R: a remaining information amount within a group of pictures (GOP)
T[k_crnt]: an information amount assigned to the current picture (k_crnt)
K[k_crnt]: the ratio (weight coefficient) of quantization of the current picture (k_crnt) to quantization of a picture (0)
N[k_crnt]: the number of remaining pictures within a GOP of the current picture (k_crnt)
picture_rate: a set frame rate
EncBitrate: a bit rate of a video image to be encoded
TQP[k_crnt]: a target QP of the current picture (k_crnt)
X[k_prev] is calculated according to the following equation using PicInfo[k_prev] and AveQP[k_prev].

$$X[k\_prev] = AveQP[k\_prev] * PicInfo[k\_prev] \qquad (21)$$

When any of 0, 1 and 2 is used as a TID, T[0], T[1], and T[2] are calculated according to the following equations using N[0], N[1], N[2], K[1], and K[2].

$$T[0] = \max\{R/M[0], \alpha\} \qquad (22)$$

$$M[0] = N[0] + (N[1]*X[1])/(K[1]*X[0]) + (N[2]*X[2])/(K[2]*X[0]) \qquad (23)$$

$$T[1] = \max\{R/M[1], \alpha\} \qquad (24)$$

$$M[1] = N[1] + (N[2]*K[1]*X[2])/(K[2]*X[1]) \qquad (25)$$

$$T[2] = \max\{R/M[2], \alpha\} \qquad (26)$$

$$M[2] = N[2] + (N[1]*K[2]*X[1])/(K[1]*X[2]) \qquad (27)$$

$$\alpha = EncBitrate/(8*picture\_rate) \qquad (28)$$

TQP[k_crnt] is calculated according to the following equation using X[k_prev] and T[k_crnt].

$$TQP[k\_crnt] = X[k\_prev]/T[k\_crnt] \qquad (29)$$

The information amount controller 412 outputs the target QP calculated according to Equation (29) to the analyzer 411. The controller 502 determines a range of block sizes of TUs based on the target QP. As the target QP is larger, the information amount control is closer to a full capacity. Thus, it is desirable that the amount of the mode information indicating whether or not the block division is to be executed be reduced. Thus, as the target QP is larger, the controller 502 sets the block sizes of the TUs to a larger value.

For example, the controller 502 uses a threshold TH_32, a threshold TH_16, and a threshold TH_8 to execute the following TU determination to determine a TU block size S_TU.

if(TQP[k_crnt]>TH_32) S_TU=32×32
else if(TQP[k_crnt]>TH_16) S_TU=16×16
else if(TQP[k_crnt]>TH_8) S_TU=8×8
else S_TU=4×4

However, TH_32>TH_16>TH_8. The controller 502 does not fix S_TU to a single value and may determine an acceptable range of S_TU so that S_TU=16×16 or less or that S_TU=16×16 or 8×8.

When a value of 3 or more is used as a TID, the range of the block sizes of the TUs may be determined based on the target QP of the current picture (k_crnt) in a similar manner.

Next, a video image encoding process to be executed by the video image encoding device 401 illustrated in FIG. 4 is described in detail with reference to FIGS. 7 to 10.

Figure 7:
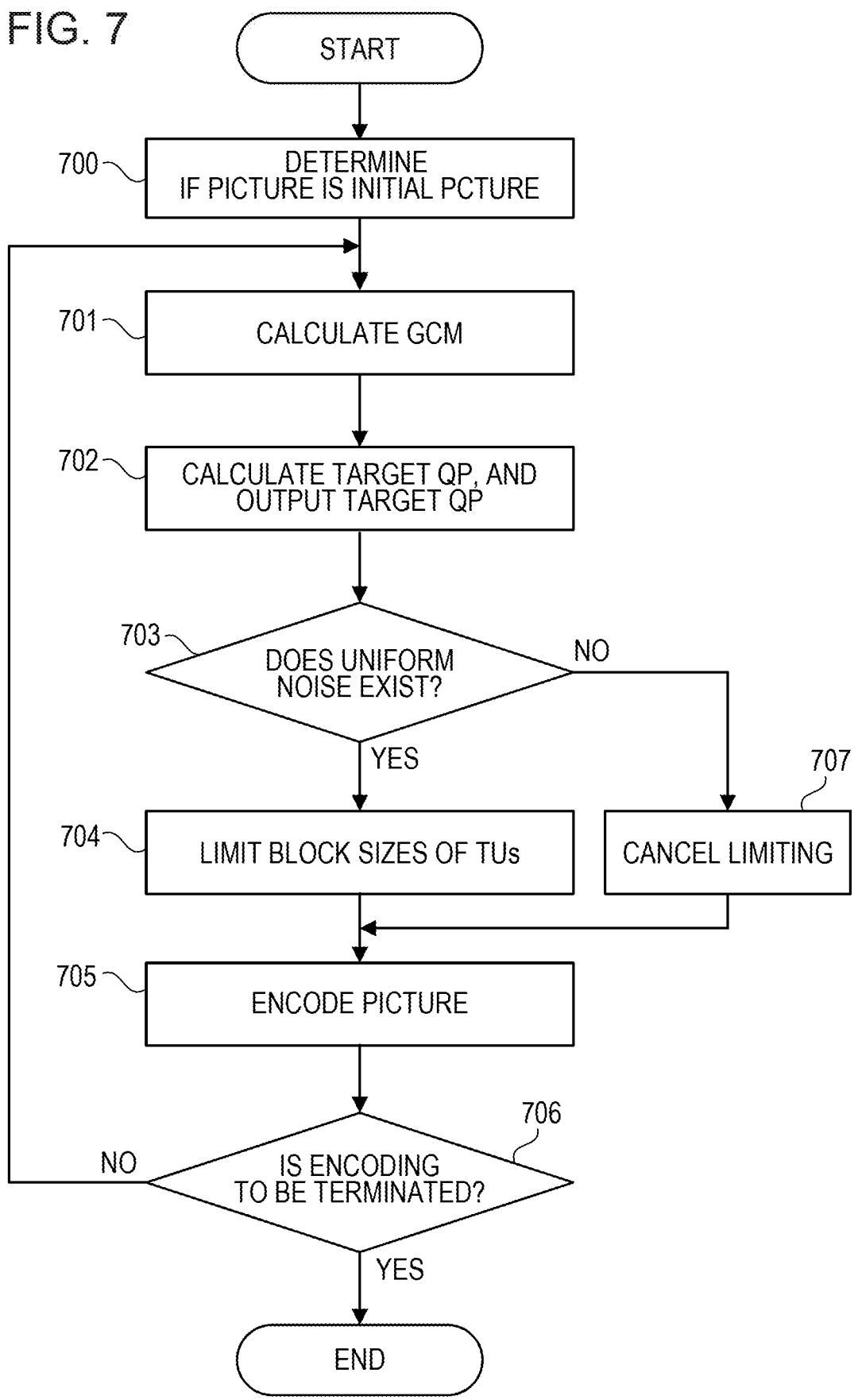
FIG. 7 is a flowchart illustrating a specific example of the video image encoding process.

FIG. 7 is a flowchart illustrating a specific example of the video image encoding process to be executed by the video image encoding device 401 illustrated in FIG. 4. The video image encoding device 401 determines if the target picture to be encoded is an initial picture (in operation 700). The information amount controller 412 uses an information amount output by the variable length encoder 422 to calculate a GCM according to Equation (21) (in operation 701). The information amount controller 412 calculates an information amount to be assigned to the current picture (k_crnt) according to Equations (22) to (28) and calculates the target QP according to Equation (29). The information amount controller 412 outputs the calculated target QP to the quantizer 421 and the analyzer 411 (in operation 702).

When the target picture to be encoded is an initial picture, the video image encoding device 401 skips operations 701 and 702.

The determiner 501 of the analyzer 411 determines whether or not uniform noise exists in the target picture to be encoded (in operation 703). When the uniform noise exists (YES in operation 703), the controller 502 limits block sizes of TUs (in operation 704). The video image encoding device 401 uses the TUs of the limited block sizes to encode the target picture (in operation 705).

In operation 705, the intra-prediction mode determiner 415 and the inter-prediction mode determiner 416 determine the block sizes of the TUs so that the block sizes are in a range defined by the maximum value and the minimum value among the block sizes of the TUs. In operation 704, the controller 502 may change the maximum value and the minimum value, thereby limiting the block sizes of the TUs.

For example, when the controller 502 determines that the block sizes of the TUs are 32×32, the controller 502 sets the maximum value and the minimum value to 32×32. By setting the maximum value and the minimum value to the same value, the block sizes of the TUs are limited to a single block size.

On the other hand, when the uniform noise does not exist (NO in operation 703), the controller 502 cancels the limiting of the block sizes of the TUs (in operation 707). The video image encoding device 401 encodes the target picture using the TUs for which the limiting has been canceled (in operation 705).

The video image encoding device 401 determines whether or not the encoding is to be terminated (in operation 706). For example, when all pictures corresponding to a predetermined time period have been encoded, the video image encoding device 401 determines that the encoding is to be terminated.

When the encoding is not to be terminated (NO in operation 706), the video image encoding device 401 repeats the processes of operations 701 and later. When the encoding is to be terminated (YES in operation 706), the video image encoding device 401 terminates the process.

Figure 8:
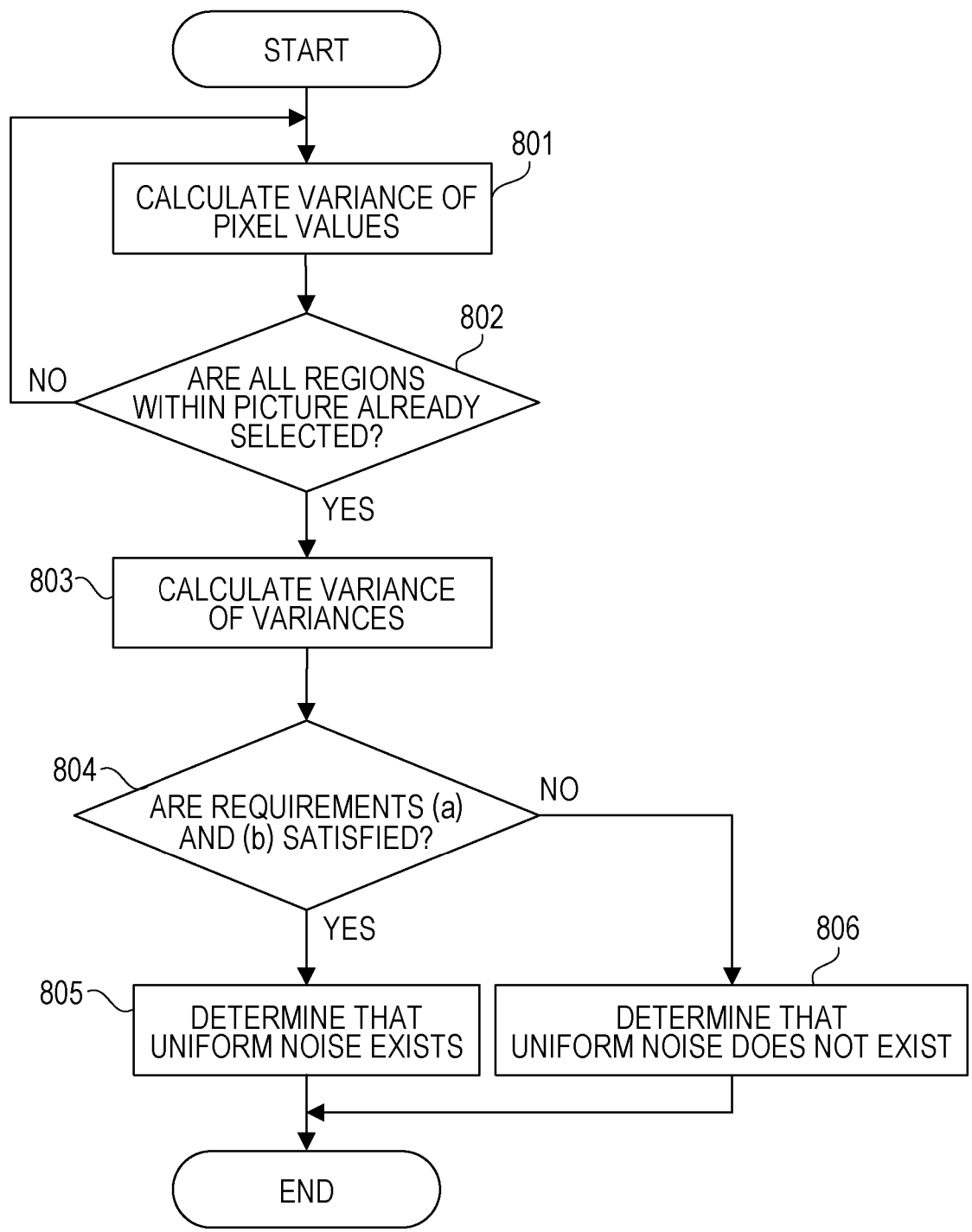
FIG. 8 is a flowchart of a noise determination process.

FIG. 8 is a flowchart illustrating an example of a noise determination process to be executed in operation 703 illustrated in FIG. 7. The determiner 501 selects one of regions within the picture to be encoded according to Equations (12) and (13) and calculates the variance V(j) of pixel values within the selected region (in operation 801). The determiner 501 checks whether or not all the regions within the picture are already selected (in operation 802).

When an unselected region remains (NO in operation 802), the determiner 501 repeats processes of operations 801 and later on the next region. When all the regions are already selected (YES in operation 802), the determiner 501 calculates the variance of variances V(j) of pixel values within the picture (in operation 803).

The determiner 501 uses Equations (11) and (14) to check whether or not the requirements (a) and (b) are satisfied (in operation 804). When V1 satisfies Equation (11), the determiner 501 determines that the requirement (a) is satisfied. When V2 satisfies Equation (14), the determiner 501 determines that the requirement (b) is satisfied.

When the requirements (a) and (b) are satisfied (YES in operation 804), the determiner 501 determines that uniform noise exists in the picture (in operation 805). On the other hand, when any of the requirements (a) and (b) is not satisfied (NO in operation 804), the determiner 501 determines that uniform noise does not exist in the picture (in operation 806).

Figure 9:
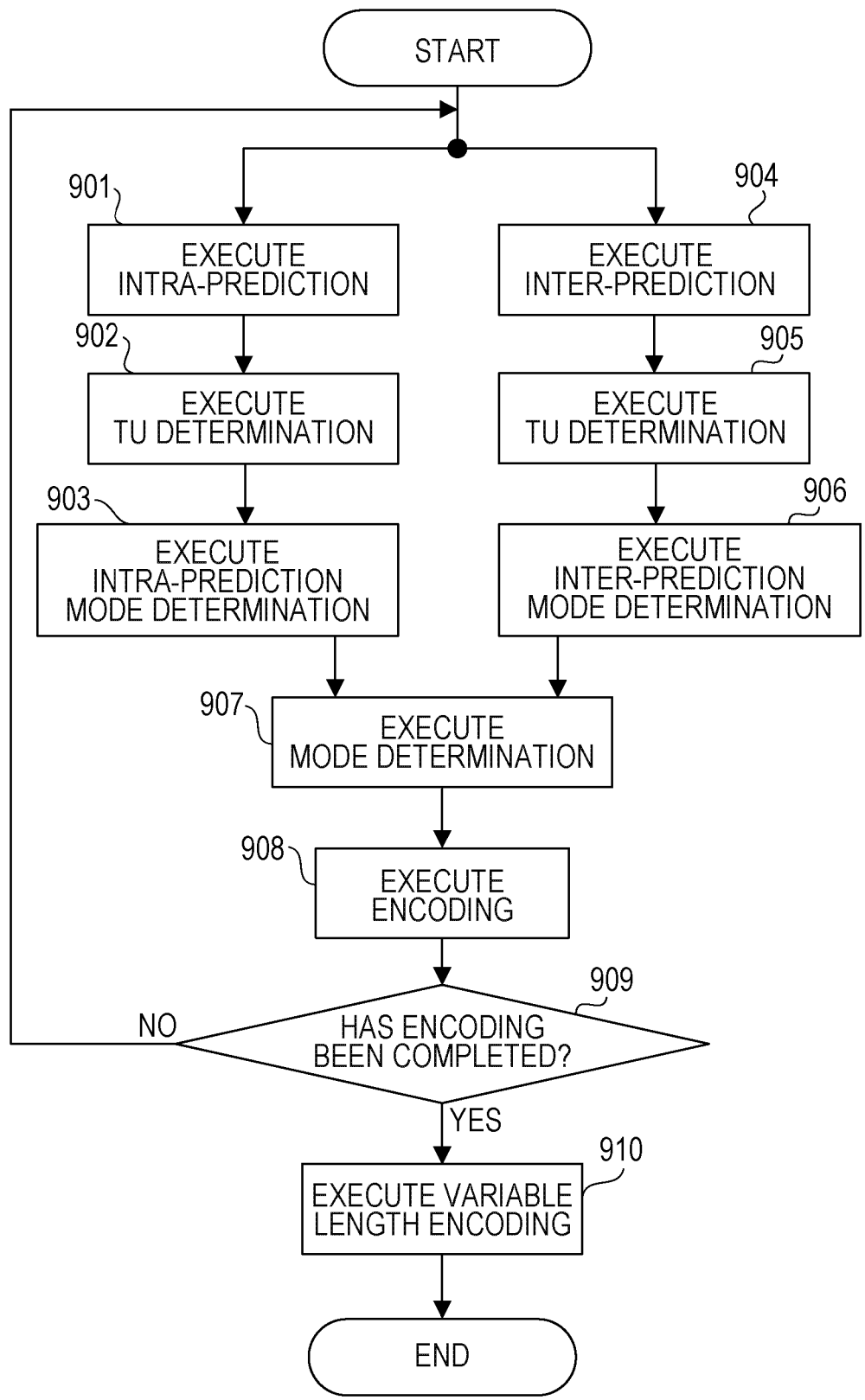
FIG. 9 is a flowchart of an encoding process.

FIG. 9 is a flowchart illustrating an example of the encoding process to be executed in operation 705 illustrated in FIG. 7. The intra-predictor 413 executes intra-prediction on CUs of block sizes (in operation 901). The intra-prediction mode determiner 415 executes the TU determination to determine the block sizes of the TUs (in operation 902) and executes intra-prediction mode determination to determine an intra-prediction mode (in operation 903).

The motion vector detector 414 executes inter-prediction on the CUs of the block sizes (in operation 904). The inter-prediction mode determiner 416 executes the TU determination to determine the block sizes of the TUs (in operation 905) and executes inter-prediction mode determination to determine an inter-prediction mode (in operation 906).

The determiner 417 executes the mode determination to determine whether the intra-prediction mode or the inter-prediction mode is to be applied on a CU basis (in operation 907). The predicted image generator 418, the difference generator 419, the orthogonal transformer 420, and the quantizer 421 encode the CUs in accordance with the prediction mode determined by the determiner 417 to generate a quantized coefficient (in operation 908).

The video image encoding device 401 determines whether or not the encoding of the target picture to be encoded has been terminated (in operation 909). When an unprocessed block remains (NO in operation 909), the video image encoding device 401 repeats the processes of operations 901 and later.

When the encoding of the target picture has been terminated (YES in operation 909), the variable length encoder 422 executes the variable length encoding on the quantized coefficient and the mode information (in operation 910). The variable length encoder 422 outputs the amount of information generated due to the variable length encoding to the information amount controller 412.

Figure 10:
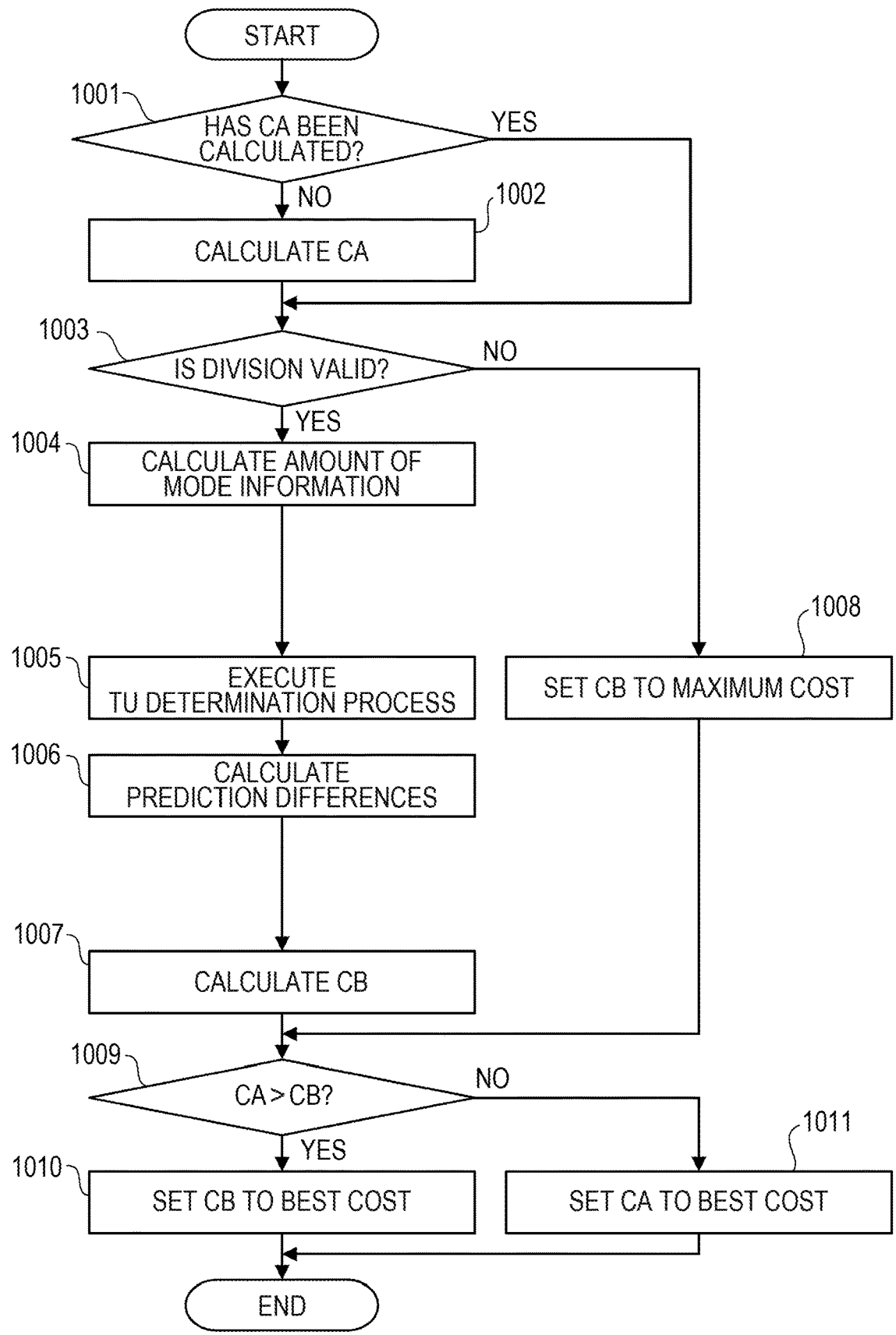
FIG. 10 is a flowchart of a TU determination process.

FIG. 10 is a flowchart illustrating an example of the TU determination process to be executed in operations 902 and 905 illustrated in FIG. 9. In a description of FIG. 10, a prediction mode determiner indicates the intra-prediction mode determiner 415 or the inter-prediction mode determiner 416. In the TU determination process, the following parameters are used.

CA: a prediction mode cost C in the case where each TU is not divided into 4 blocks
CB: a prediction mode cost C in the case where each TU is divided into 4 blocks
Smax: the maximum value among block sizes of TUs
Smin: the minimum value among the block sizes of the TUs When the block sizes are not limited, Smax is determined from block sizes of PUs, and Smin is set to 4×4. On the other hand, when the block sizes are limited, Smax and Smin are specified by the analyzer 411.

In an initial state, the block sizes of the TUs are set to Smax, and CA and CB are set to a predetermined maximum cost. The maximum cost may be a theoretical value calculated from the number of bits of each pixel value or the like.

The prediction mode determiner checks whether or not CA for TUs of a current block size is already calculated (in operation 1001). In the initial state, the current block size is equal to Smax. When CA has yet to be calculated (NO in operation 1001), the prediction mode determiner calculates CA according to Equation (1) (in operation 1002).

The prediction mode determiner checks whether or not the division of each of the TUs of the current block size into 4 blocks is valid (in operation 1003). When block sizes SD of the TUs after the division satisfy the following equation, the prediction mode determiner determines that the division of each of the TUs into 4 blocks is valid.

$$Smin \leq SD \leq Smax \quad (31)$$

When the division of each of the TUs into 4 blocks is valid (YES in operation 1003), the prediction mode determiner calculates an amount RB of mode information when the division of each of the TUs into 4 blocks has been executed (in operation 1004). The prediction mode determiner executes the TU determination process on each of 4 small blocks into which each of the TUs is divided (in operation 1005), and the prediction mode determiner calculates prediction differences D according to Equation (1) (in operation 1006). In operation 1005, the TU determination process illustrated in FIG. 10 is recursively called, and a block size of each of the small blocks after the division is used as the current block size.

When the calculation of the prediction differences D for all the small blocks is terminated, the prediction mode determiner uses the sum DB of prediction differences D of 4 small blocks of each of the TUs and the amount RB of the mode information to calculate CB according to the following equation (in operation 1007).

$$CB = DB + \lambda * RB \quad (32)$$

When the division of each of the TUs into 4 blocks is not valid (NO in operation 1003), the prediction mode determiner sets CB to the maximum cost (in operation 1008).

The prediction mode determiner compares CA with CB (in operation 1009). When CA is larger than CB (YES in operation 1009), the prediction mode determiner sets CB to a best cost (in operation 1010). When CA is equal to or smaller than CB (NO in operation 1009), the prediction mode determiner sets CA to the best cost (in operation 1011).

When the best cost is CB, the prediction mode determiner determines that each of the TUs of the current block size is to be divided into 4 blocks. When the best cost is CA, the prediction mode determiner determines that each of the TUs of the current block size is not to be divided into 4 blocks.

In the TU determination process illustrated in FIG. 10, the block sizes of the TUs may be determined to be in a range specified by the analyzer 411.

For example, when Smax and Smin are set to the same value, the prediction mode determiner determines that the division of each of the TUs into 4 blocks is not valid in operation 1003, and the prediction mode determiner sets CB to the maximum cost in operation 1008. In this case, since the prediction mode determiner determines that CA is equal to or smaller than CB in operation 1009, the prediction mode determiner sets CA to the best cost in operation 1011, and the block sizes of the TUs are set to Smax. Thus, by setting Smax and Smin to the same value, the block sizes of the TUs are limited to a single block size.

The video image encoding device 401 may limit the sizes of blocks of a single partial image among multiple partial images within a picture, instead of limiting the sizes of blocks within the entire picture. In this case, the video image encoding device 401 uses the limited block sizes to encode only the partial image.

For example, in HEVC, a picture may be divided into subpictures that are also referred to as tiles or slices, and the video image encoding may be executed on each of the subpictures. In this case, the video image encoding process illustrated in FIG. 7 may be executed on each of the subpictures.

Figure 11A:
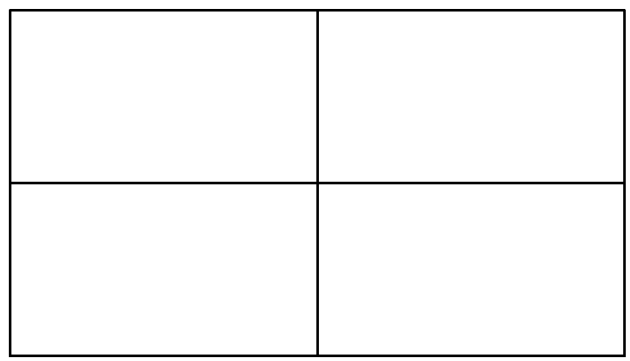
FIGS. 11A and 11B are diagrams describing methods for dividing a picture.
Figure 11B:

FIGS. 11A and 11B illustrate examples of a method for dividing a picture. FIG. 11A illustrates an example in which a picture is divided into 4 tiles by executing cross division into the 2×2 tiles. FIG. 11B illustrates an example in which a picture is divided into 4 slices by executing horizontal division into the 1× 4 slices. The sizes of the subpictures after the division may not be the same.

When the noise determination process illustrated in FIG. 8 is executed on each subpicture, the determiner 501 divides the subpicture to be processed into a number M of regions and calculates the variance V(j) of pixel values in each of the regions according to Equations (12) and (13) in operation 801. In operation 803, the determiner 501 calculates the variance of variances V(j) of pixel values within the subpicture according to Equations (14) and (15).

In operation 804, the determiner 501 checks whether or not V1 and V2 of the subpicture satisfy Equations (11) and (14), thereby determining whether or not uniform noise exists in the subpicture.

In the video image encoding process illustrated in FIG. 7, block sizes of TUs are limited, but block sizes other than the TUs may be limited. For example, a range of the block sizes of the TUs is limited indirectly by limiting a range of block sizes of CUs. Thus, a subjective quality of a decoded image of a picture in which uniform noise exists is improved in a similar manner to the case where the range of the block sizes of the TUs is directly limited.

The configurations of the video image encoding device illustrated in FIGS. 2 and 4 are examples, and one or more of the constituent elements of the video image encoding device may be omitted or changed depending on the use or conditions of the video image encoding device. The configuration of the analyzer 411 illustrated in FIG. 5 is an example, and one or more of the constituent elements of the analyzer 411 may be omitted or changed depending on the use or conditions of the analyzer 411.

The flowcharts illustrated in FIGS. 3 and 7 to 10 are examples, and one or more of the processes may be omitted or changed depending on the use or conditions of the video image encoding device. The video image encoding device may determine a range of limited block sizes based on a parameter other than the target QP. In addition, the video image encoding device may use another video image encoding scheme other than HEVC to execute the video image encoding process.

The decoded images illustrated in FIGS. 1 and 6 are examples, and noise distributions of the decoded images vary depending on images to be encoded. The division methods illustrated in FIGS. 11A and 11B are examples, and the pictures may be divided by another division method.

Equations (1) to (32) are examples, and other equations may be used depending on the configurations and conditions of the video image encoding device. For example, the requirement (a) may be expressed according to an equation different from Equation (11), and the requirement (b) may be expressed according to an equation different from Equation (14).

The predetermined noise distribution may indicate noise that spatially changes in a predetermined pattern within a picture, instead of noise uniformly distributed within the picture. In this case, the determiner 501 uses another requirement indicating a pattern of noise instead of the requirements (a) and (b) to determine whether or not a noise distribution within a picture is the predetermined noise distribution.

Figure 12:
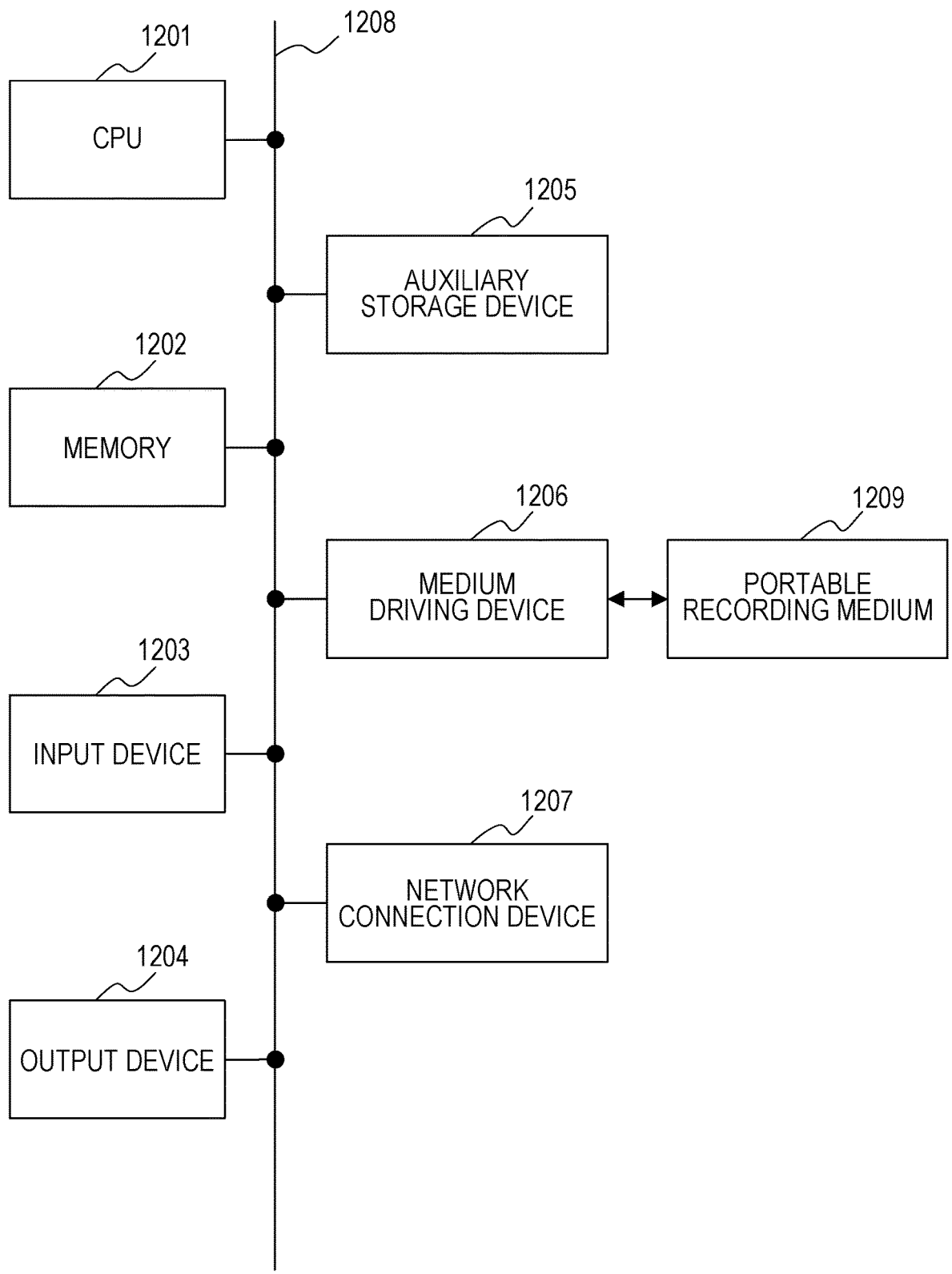
FIG. 12 is a diagram illustrating a configuration of an information processing device.

The video image encoding device illustrated in FIGS. 2 and 4 may be implemented as a hardware circuit or may be implemented using an information processing device (computer) illustrated in FIG. 12.

The information processing device illustrated in FIG. 12 includes a central processing unit (CPU) 1201, a memory 1202, an input device 1203, an output device 1204, an auxiliary storage device 1205, a medium driving device 1206, and a network connection device 1207. These constituent elements 1201 to 1207 are connected to each other via a bus 1208.

The memory 1202 is, for example, a semiconductor memory such as a read only memory (ROM), a random access memory (RAM), or a flash memory and stores a program and data that are used in the processes. The memory 1202 may be used as the flame memory 426 illustrated in FIG. 4. The memory 1202 may store the results of calculating Equations (1) to (32).

The CPU 1201 (processor) uses the memory 1202 to execute the program, thereby operating as the determiner 211, the controller 212, and the encoder 213 that are illustrated in FIG. 2, for example.

The CPU 1201 uses the memory 1202 to execute the program, thereby also operating as the analyzer 411 and the information amount controller 412 that are illustrated in FIG. 4. The CPU 1201 uses the memory 1202 to execute the program, thereby also operating as the intra-predictor 413, the motion vector detector 414, the intra-prediction mode determiner 415, the inter-prediction mode determiner 416, and the determiner 417.

The CPU 1201 uses the memory 1202 to execute the program, thereby also operating as the predicted image generator 418, the difference generator 419, the orthogonal transformer 420, the quantizer 421, and the variable length encoder 422. The CPU 1201 uses the memory 1202 to execute the program, thereby also operating as the inverse quantizer 423, the inverse orthogonal transformer 424, and the reconfigurer 425.

The CPU 1201 uses the memory 1202 to execute the program, thereby also operating as the determiner 501 and the controller 502 that are illustrated in FIG. 5.

The input device 1203 is, for example, a keyboard, a pointing device, or the like and is used to input an instruction and information from a user or an operator. The output device 1204 is, for example, a display device, a printer, a speaker, or the like and is used to output an inquiry and process results to the user or the operator.

The auxiliary storage device 1205 is, for example, a magnetic disk device, an optical disc device, a magneto-optical disc device, a tape device, or the like. The auxiliary storage device 1205 may be a hard disk drive or a flash memory. The information processing device may store the program and the data in the auxiliary storage device 1205, load the program and the data into the memory 1202, and use the program and the data.

The medium driving device 1206 drives a portable recording medium 1209 and accesses details of data recorded in the portable recording medium 1209. The portable recording medium 1209 is a memory device, a flexible disk, an optical disc, a magneto-optical disc, or the like. The portable recording medium 1209 may be a compact disc read only memory (CD-ROM), a digital versatile disc (DVD), a Universal Serial Bus (USB) memory, or the like. The user or the operator may store the program and the data in the portable recording medium 1209, load the program and the data into the memory 1202, and use the program and the data.

A computer-readable recording medium storing the program and the data that are used in the processes may include a physical (non-transitory) recording medium such as the memory 1202, the auxiliary storage device 1205, or the portable recording medium 1209.

The network connection device 1207 is a communication interface circuit connected to a communication network such as a local area network (LAN) or the Internet and configured to execute data conversion for communication. The network connection device 1207 may transmit the bitstream to a video image decoding device. The information processing device may receive the program and the data from an external device via the network connection device 1207, load the program and the data into the memory 1202, and use the program and the data.

The information processing device may not include all the constituent elements illustrated in FIG. 12, and one or more of the constituent elements may be omitted depending on the use and conditions of the information processing device. For example, in the case where an interface with the user or the operator is not used, the input device 1203 and the output device 1204 may be omitted. In addition, in the case where the information processing device does not access the portable recording medium 1209, the medium driving device 1206 may be omitted.

Although the embodiment disclosed herein and advantages of the embodiment are described above, a person skilled in the art may make various changes, modifications, and omissions without departing from the scope of the appended claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A video image encoding device comprising:
a memory; and
a processor coupled to the memory and the processor configured to:
determine a noise distribution within a target image to be encoded and included in a video image;
limit sizes of blocks to be used for video image encoding of the target image to one or more sizes among multiple selectable sizes when it is determined that the noise distribution within the target image to be encoded is a predetermined noise distribution;
encode the target image by executing the video image encoding using the blocks of the one or more sizes; and
determine a range of the one or more sizes, based on a complexity of an image encoded before the encoding of the target image and an information amount determined by information amount control and to be assigned.

2. The video image encoding device according to claim 1, wherein the processor is configured to determine, based on multiple pixel value distributions of multiple regions within the target image to be encoded and a similarity between the multiple pixel value distributions, whether or not the noise distribution within the target image to be encoded is the predetermined noise distribution.

3. The video image encoding device according to claim 2, wherein the processor is configured to determine, when a sum of variances of pixel values of the multiple pixel value distributions is larger than a first threshold, and a variance of the variances of the pixel values within the target image to be encoded is smaller than a second threshold, that the noise distribution within the target image to be encoded is the predetermined noise distribution.

4. The video image encoding device according to claim 1, wherein the one or more sizes is one size among the multiple sizes.

5. The video image encoding device according to claim 1, wherein the predetermined noise distribution indicates noise uniformly distributed within the target image to be encoded.

6. The video image encoding device according to claim 1, wherein the target image to be encoded is a single partial image among multiple partial images within an image included in the video image and corresponding to a single time point.

7. A video image encoding method, performed by a processor, comprising:
determining a noise distribution within a target image to be encoded and included in a video image;
limiting sizes of blocks to be used for video image encoding of the target image to one or more sizes among multiple selectable sizes when it is determined that the noise distribution within the target image to be encoded is a predetermined noise distribution;
encoding the target image by executing the video image encoding using the blocks of the one or more sizes; and
determine a range of the one or more sizes, based on a complexity of an image encoded before the encoding of the target image and an information amount determined by information amount control and to be assigned.

8. The video image encoding method according to claim 7, wherein the processor is configured to determine, based on multiple pixel value distributions of multiple regions within the target image to be encoded and a similarity between the multiple pixel value distributions, whether or not the noise distribution within the target image to be encoded is the predetermined noise distribution.

9. The video image encoding method according to claim 8, wherein the processor is configured to determine, when a sum of variances of pixel values of the multiple pixel value distributions is larger than a first threshold, and a variance of the variances of the pixel values within the target image to be encoded is smaller than a second threshold, that the noise distribution within the target image to be encoded is the predetermined noise distribution.

10. A computer-readable non-transitory recording medium storing a program that causes a computer to execute a procedure, the procedure comprising:
determining a noise distribution within a target image to be encoded and included in a video image;
limiting sizes of blocks to be used for video image encoding of the target image to one or more sizes among multiple selectable sizes when it is determined that the noise distribution within the target image to be encoded is a predetermined noise distribution;
encoding the target image by executing the video image encoding using the blocks of the one or more sizes; and
determines a range of the one or more sizes, based on a complexity of an image encoded before the encoding of the target image and an information amount determined by information amount control and to be assigned.

11. The computer-readable non-transitory recording medium according to claim 10, wherein the procedure determines, based on multiple pixel value distributions of multiple regions within the target image to be encoded and a similarity between the multiple pixel value distributions, whether or not the noise distribution within the target image to be encoded is the predetermined noise distribution.

12. The computer-readable non-transitory recording medium video according to claim 11, wherein the procedure determines, when a sum of variances of pixel values of the multiple pixel value distributions is larger than a first threshold, and a variance of the variances of the pixel values within the target image to be encoded is smaller than a second threshold, that the noise distribution within the target image to be encoded is the predetermined noise distribution.

* * * * *